INVENTOR
Searcy F. Griffin
Samuel D. Turner, Jr.
BY Donald H. Fidler
ATTORNEY

INVENTOR
Searcy F. Griffin
Samuel D. Turner, Jr.

BY Donald H. Fidler
ATTORNEY

ELECTRONIC SELECTING SYSTEMS

Filed Aug. 5, 1957 3 Sheets-Sheet 3

INVENTOR
Searcy F. Griffin
Samuel D. Turner, Jr.
BY
Donald H. Fidler
ATTORNEY

United States Patent Office 3,100,819
Patented Aug. 13, 1963

3,100,819
ELECTRONIC SELECTING SYSTEMS
Searcy F. Griffin, Garland, and Samuel D. Turner, Jr., Dallas, Tex., assignors to Varo, Inc., a Texas corporation
Filed Aug. 5, 1957, Ser. No. 676,091
6 Claims. (Cl. 179—15)

This invention relates to electric valve circuits and more particularly to an electric valve circuit which selectively operates in two different manners.

This invention also relates to a selecting system which provides a means of interconnecting a receiver system, a transmission system and a telephone system and more particularly interconnecting a two terminal input telephone system to a four terminal system consisting of separate receiver and transmission systems, each having two terminals.

This invention also relates to a radio-telephone system for connecting a telephone system to a radio receiver and transmitter system to enable communication between separated radio-telephone systems.

It is an object of this invention to provide a new and improved electronic selecting system to selectively channel signals from various origins to proper selected channels.

It is an object of this invention to provide a new and improved electronic system which is adapted to transmit signals of varying voltages and receive signals of varying voltages.

It is an object of this invention to provide a means of inter-connecting a bi-directional two terminal alternating current system to a uni-directional two terminal channel in one direction and a uni-directional two terminal channel in another direction.

It is an object of this invention to provide a means of inter-connecting a bi-directional two terminal alternating current system as described in the above paragraph so that, in one direction intelligence is received and in the other direction intelligence is transmitted.

It is an object of this invention to provide a means of inter-connecting a two terminal alternating current system as described in the preceding paragraphs so that communications may be made under conditions of varying impedance in the two terminal bi-directional system.

It is an object of this invention to provide an electronic valve means with incoming, outgoing and terminating channels wherein signals to the incoming channel are effectively isolated from the outgoing channel by substantial cancellation of the signal in the electron stream of the electric valve means.

It is an object of this invention to provide a new and improved electronic circuit which has an incoming channel, outgoing channel and a terminating channel and a valve means to selectively apply incoming signals of varying voltages to the terminating channel and also allow signals of varying voltages originated in the terminating channel to be sent out through the outgoing channel.

It is an object of this invention to provide a new and improved electronic circuit which has an incoming channel, outgoing channel and a terminating channel and a valve means to selectively allow incoming signals of varying voltages to be sent to the terminating channel and also allow signals of varying voltages originated in the terminating channel to be sent out through the outgoing channel while maintaining the signals at a substantially constant power level under conditions of varying impedance in the terminating channel.

It is an object of this invention to provide a new and improved electronic circuit which has an incoming channel and outgoing channel, a terminating channel and valve means to selectively allow signals of varying voltages received in the incoming channel to be sent to the terminating channel and signals of varying voltages emanating from the terminating channel to be sent from the terminating channel to the outgoing channel in such a manner that the received signals are isolated from the outgoing channel.

It is an object of this invention to provide a new and improved electronic circuit which has an incoming channel, an outgoing channel, a terminating channel and a valve means to selectively allow signals of varying voltages received in the incoming channel to be sent to the terminating channel to the outgoing channel, the valve means acting to effectively isolate the incoming signals from the outgoing channel.

It is an object of this invention to provide a new and improved electronic circuit which has an incoming channel, an outgoing channel, a terminating channel and valve means to selectively allow signals of varying voltages received in the incoming channel to be sent to the terminating channel and signals of varying voltages emanating from the terminating channel to be sent from the terminating channel to the outgoing channel and wherein the incoming channel signals are isolated in the outgoing channel by substantial cancellation of the electron stream of the valve means.

For a better understanding of the invention together with other and further objects thereof, reference may be had to the following description taken in connection with the accompanying drawings, and its scope will be pointed out in the appended claims.

Figure 1:
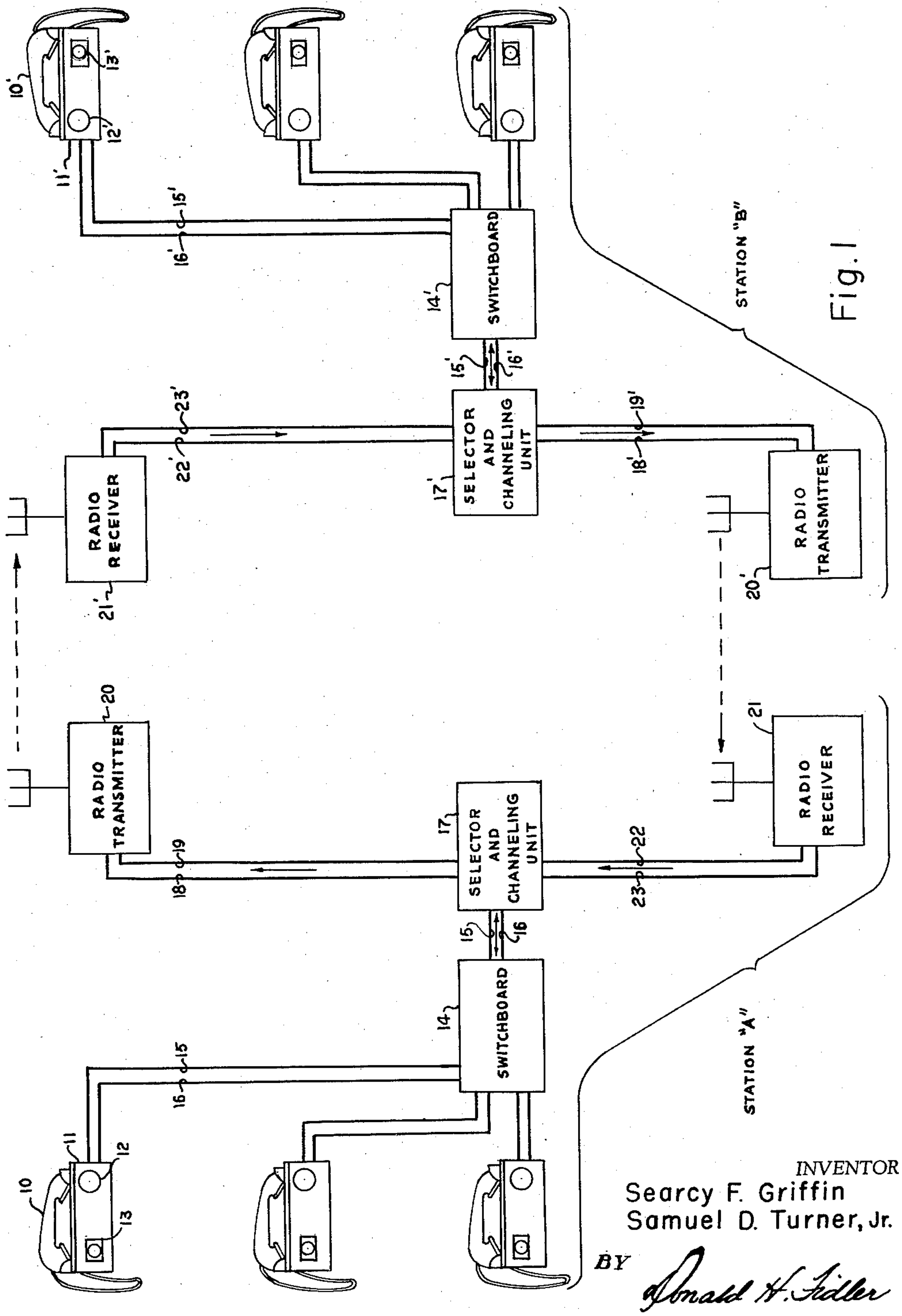
FIGURE 1 illustrates in block diagram the selector and channeling unit as applied to a radio-telephone transmission system.

Referring now more particularly to FIGURE 1 of the drawing a radio-telephone transmission system embodying the invention is illustrated. Two separate radio-telephone units A and B are shown, hereinafter referred to as station A and station B, and together comprise a bi-directional communication system. Since the two stations are identical in construction, the description of one will suffice for a description of the other, it being understood that the corresponding components of the stations A and B are similarly identified by identical reference characters, the reference characters applied to the components of station B having primes added thereto to differentiate them from the reference characters of the corresponding components of Station A.

The radio-telephone transmission system is designed to enable a person to originate a call from a first station to a second station by ringing the second station. When a person at the second station answers the call by picking up the telephone receiver, a bi-directional contact is made between the two stations enabling the person at the first station to talk to the answering person at the second station and allowing the answering person at the second station to respond to the person at the first station. Since the units are identical, either station may ring the other. Once both of the telephone receivers have been connected in the circuit, conversation may take place allowing two way communication. One or more telephones may be connected to the switchboard of either station and may be connected simultaneously or individually as desired. It will be appreciated that as the number of telephones connected in a station is increased, the impedance of the system to the selector and channeling unit will be decreased. This would normally cause a decrease in the amplitudes of the signal of varying voltage sent from the transmitter of the station, however, the selector and channeling unit of the invention provides automatic gain-control so that the signal voltage level is maintained substantially constant.

In operation, two types of signals are present, namely, a contact signal to ring a bell means and the normal speech signal or conversation. Consequently, each selector and channeling unit 17 is provided with a selective parallel arrangement consisting of a contact signal path and a communication path which are so arranged that only the communication path is normally connected in the circuit. If a contact signal is received by a selector and channeling unit the communication path is disconnected for the duration of the time that the contact signal is received. When the contact signal is terminated, the selector and channeling unit simultaneously connects in the communication path and disconnects the contact signal path. More specifically, if a first person at Station A, for example, would pick up the telephone receiver 10 from the telephone receiver unit 11 and with a means provided, such as means 12, generate a contact signal which is a low frequency signal voltage, for example, a frequency of 20 c.p.s. This low frequency signal voltage from the telephone receiver unit 11 is transmitted to the selector and channeling unit 17 via conductors 15 and 16 and thru switchboard 14. The conductors 15, and 16 provide a duplex channel in that a generated voltage may be sent to the selector and switching unit 17 or received from the said unit via the said conductors. When the 20 cycle signal voltage is sent to the selector channeling unit 17, a relay in the switching and channeling unit 17 is tripped to connect an 800 cycle generator to the transmitter 20 via conductors 18 and 19. The conductors 18 and 19 constitute a simplex channel in that generated voltages are conducted in only one direction along the conductors. The 800 cycle signal generated is the contact signal transmitted through the atmosphere, in a manner well known, by transmitter 20 to the receiver 21 of station B. It will be readily apparent that cables or other well known transmission means may be used, if desired, to transmit the signal.

The receiver 21', upon receipt of the 800 cycle signals, channels the signal voltage through conductors 22' and 23' to a selector and channeling unit 17' and the frequency of the signal voltage in turn, trips a relay which connects a 20 cycle generator to the telephone receiver unit 11' via conductors 15' and 16' thru switchboard 14' and simultaneously disconnects the communication path. The 20 cycle signal voltage actuates a ringing means 13' which emits an audible bell tone in the telephone receiver unit 11'. It will be understood that other similar stations will also pick-up the contact signal and accordingly ring respective telephone receviers. Means are provided in the selector and channeling unit 17 and 17' whereby the person at station A and telephone receiver unit 11 can hear the bell ring at station B. Upon discontinuance of the contact signal the communication path is connected in the circuit so that a person at station B upon hearing the bell tone or contact signal, and answering the telephone receiver 10' is directly connected by the communication system to the first person located at station A. When the first persosn speaks over the telephone receiver 10 at the station A, the audio sound waves are converted to electrical signal voltages, in a manner well known, and passed through the switchboard 14, the selector and channeling unit 17 to the transmitter 20 to the receiver 21' to the selector and channeling units 17' through the switchboard 14' to the telephone receiver 10'. In turn, the person speaking from the telephone 10' has the audio sound waves converted into signal voltages, in a manner well known in the telephone receiver unit 11' which in turn pass through the switchboard 14, selector and channeling unit 17', to the transmitter 20' to the receiver 21 to the selector and channeling unit 17 through the switchboard 14 to the telephone receiver 10 so that a two way communication may be had between the two stations. At each station, one or more telephone receivers may be connected in the system, and selective communication may be had between any one receiver at one station and a receiver at the other station by the coding of the number of bell rings. In other words, a first telephone at station B may have a signal ring of 1 ring, another telephone may have a signal of 2 rings, another telephone 3 rings, etc. It will be understood that all telephones may be connected in and several persons may listen to one person speaking at the other station or several persons may talk at one station to a single receiver at another station.

It will be understood that the electric valve means hereinafter referred to may be any of several types well known in the art, but preferably are the vacuum type unless otherwise designated. Also in reference to the accompanying schematic drawings, it will be understood that a direct current path is provided from a positive source of direct current potential to a negative or ground source of direct current, the direct current supply source being indicated as B+, B+1 and B+2. A convenient value for B+ is 150 volts, for *B*+1, 105 volts and B+2, 150 volts.

Figure 2:
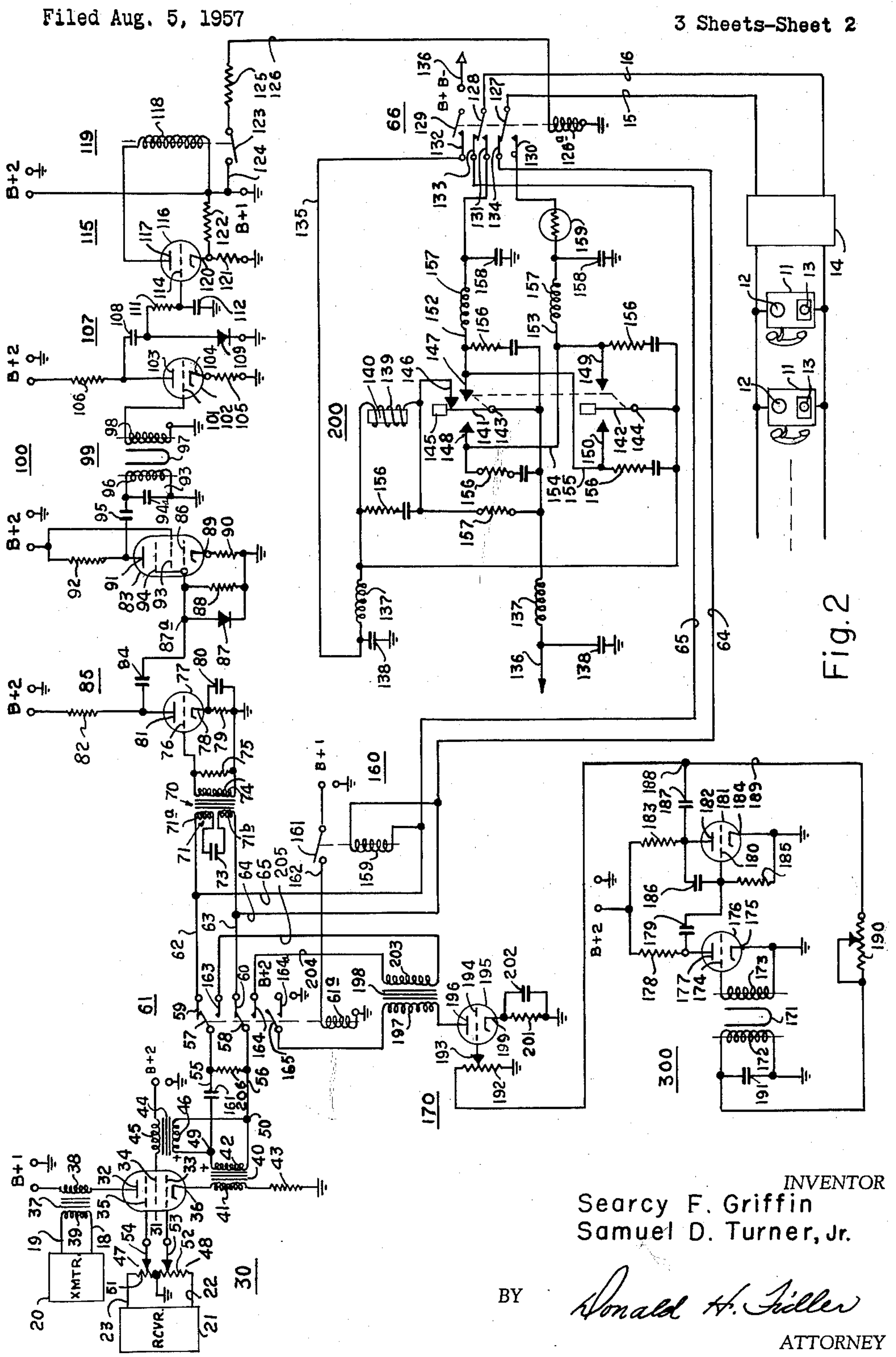
FIGURE 2 illustrates a schematic diagram of the selector and channeling unit.

Referring now more particularly to FIGURE 2 which illustrates the selecting and channeling unit 17 in a schematic manner, there is shown a selector and channeling means 30, a frequency sensing means 100, a first frequency generator 200 and a second frequency generator 300, which elements generally comprise the selecting and channeling unit 17.

The selector and channeling means 30 has an electric valve means 31 which functions as a switching valve and because it has a dual function is designed as a "hybrid" unit. The electric valve means 31 is composed of an anode 32, a first control grid 33, a screen grid 34, a second control grid 35, and a cathode 36. The dual function of the valve means 31 may be best understood by considering the functions of the valve means separately and also in the steady state operation of the valve means.

In steady state operation, a first part of the electron flow in the valve means 31 is maintained from the cathode 36 to the anode 32 and a second part of the electron flow is maintained from the cathode 36 to the screen grid 34 which is located between the cathode 36 and anode 32. The valve means has an anode circuit which consists of a transformer 37 having a primary and secondary windings 38 and 39, the primary windings being connected between the anode 32 and the positive side of a source of direct current B+1 and the secondary windings being connected to a transmitter 20. The cathode circuit consists of a transformer 40 having primary and secondary windings 41 and 42, the primary windings being connected between the cathode 36 and a biasing resistor 43 which, in turn, is connected to the other side of the direct current source. The secondary windings are connected to terminals 49 and 50 which are the input terminals to be later explained. The screen grid 34 circuit consists of a transformer 44 having primary and secondary windings 45 and 46 where the primary windings are connected between the screen grid 34 and a positive side of a source of potential B+2 and the secondary windings are connected to the input terminals 49 and 50. The source of potential B+2 on the screen grid circuit is preferably at a higher potential than the source of potential B+1 on the anode circuit for reasons which will become apparent in the following discussion although this is not essential. It will be appreciated from the above, that a direct current circuit has been described, wherein an electron flow from the negative or other side of the direct current source occurs thru the cathode circuit of the electric valve means 31 to the anode circuit of the electric valve means 31 and also occurs from the negative side of the direct current source through the cathode and the screen grid circuit.

The cathode 36 and screen grid 34 are coupled together, by means of the secondary windings 42 and 46 of transformers 40 and 44, to the input terminal 49 and 50 in such a manner that the polarity of a voltage on the respective windings is in phase which is indicated in the drawings by a (+) sign. The first and second control grids 33 and 35 are connected to the receiver thru potentiometers 47 and 48.

It will be readily apparent to those skilled in the art that with no bias potential on the control grids, a screen and plate current of a given valve will be present at the steady state operation. A constant current flow thru the respective transformers 37, 40 and 44, of course means that the transmitter has no signal voltage to transmit and that no signal voltage is being applied to the telephone system.

To transmit a signal voltage from one station to the other, a signal voltage is generated in the telephone unit 11 and is transmitted by circuitry, to be later explained, to the terminals 49, 50 on the secondary windings 42 and 46 of the transformers 40 and 44. Considering first the cathode circuit, it will be recalled that a constant current flow is present and therefore the cathode 36 is at a potential that is determined by the potential drop across resistance 43. If now, the generated signal voltage causes the potential across secondary winding 42 to increase so that the (+) side of the winding is more positive with respect to the other side of the winding, a potential will be induced in the primary windings 41 which is opposite to the potential across the resistance and consequently the cathode will be less positive with respect to the grounded first control grid 33 which causes an increased current and electron flow in the valve means 31. The increased current flow causes the potential on the anode 32 and the screen 34 to decrease. The decreasing potential on the primary windings 45 of the screen transformer 44 is reflected back thru the secondary windings 46 and the secondary winding 42 of the cathode transformer 40 which causes a slight increase in the potential applied to the cathode which further increases the current flow in the valve means 31. The decreasing potential on the anode 32 is reflected thru the transformer 37 to the transmitter 20. Conversely, when the potential across the secondary winding 42 of the cathode transformer 40 tends to decrease, the potential induced in the primary windings 41 adds to the potential across the resistance and hence the cathode 36 appears more positive with respect to the first control grid 33 which, in turn, decreases the electron and current flow. The decreased current flow causes the potential on the anode 32 and the screen 34 to increase. The increasing potential on the primary windings 45 of 44 is reflected back thru the secondary windings 46 and the secondary winding 42 of the cathode transformer 40 which causes a slight decrease in the bias potential applied to the cathode 36 which further decreases the current flow in the valve means 31. The increasing potential on the anode 32 is reflected through the transformer 37 to the transmitter 20.

The degenerative action of the potential across the screen transformer 44 to the potential across the cathode transformer 40 reduces the distortion of the signal or varying voltage in the valve means 31, improves frequency response and gain stability and also makes the gain of the valve means more independent of the load impedance. For example, for one phone in the circuit, a certain impedance and voltage will be presented to the cathode transformer. As the number of phones connected across the line increases, the impedance decreases and the resultant voltage decrease of the signal applied to terminals 49, 50 means a decreased potential is applied to the cathode transformer. The decreased potential on the cathode transformer means that the feedback from the screen transformer tends to decrease which, in turn, causes the effective gain of the valve means to increase. The increase in gain offsets the tendency of the potential received from the telephones to drop, so that the potential applied to the cathode transformer remains nearly constant. On the other hand, if the load, i.e. the number of the telephones in use, is decreased, the rise in the potential applied to the cathode transformer is checked by increased feedback from the screen transformer. It will be appreciated then, that the above circuit insures a substantially constant power level under conditions of varying impedance. It will also be appreciated that an applied signal voltage at terminals 49, 50 will, in turn, increase and decrease the conductivity of valve means 31 so that the potential on the anode 32 of valve means 31 will correspondingly increase and decrease in such a manner that the applied signal voltage to the cathode transformer is amplified in the anode circuit and applied to the transmitter 20 for transmission.

To receive a signal voltage from another station to the described station, the signal voltage is received by the receiver 21 in a manner well known and is converted to a push-pull voltage in the receiver 21 by conventional means, not shown, and applied to the respective first and second control grids 33 and 35 of the electric valve 31 means via conductors 22 and 23 and potentiometers 47 and 48. The potentiometers 47 and 48 consist of series resistances 51 and 52 connected at an electrical midpoint to the negative side of the direct current source and have their ends connected to the respective conductors 22 and 23. The conductors 22 and 23 are connected to a positive source of direct current through proper circuitry in the receiver 21. Adjustable potentiometer arms 53 and 54 are connected to the respective first and second control grids 33 and 35. It will be readily understood by those skilled in the art that a push-pull voltage has a mirror symmetry about a given point, which is, in this instance, the negative side of the direct current source at the electrical midpoint of series resistances 51 and 52. It will also be apparent that the amplitude of the potential applied to the control grids may be adjusted by means of the potentiometer arms 53, 54. If the potential applied to the first control grid 33 tends to go positive then the potential on the second control grid 35 is tending to go negative. The positive going first control grid 33 causes an increase in electron flow from the cathode 36. The screen grid 34 acts as a virtual anode so that an increased current flow occurs in screen-cathode circuit which causes the potential on the screen grid 34 to decrease and the potential on the cathode 36 to increase. Since the secondary windings 42 and 46 of the cathode transformer 40 and the screen transformer 44 are connected in phase, the net effect to the terminals 49 and 50 is to add the increased potentials which constitutes the signal supplied to the telephone receiver system. The feedback loop of the screen transformer 44 to the cathode transformer 40 is degenerative in effect and causes the biasing potential on the cathode 36 to increase which in turn decreases the current and electron flow between the cathode-screen a certain amount.

Simultaneously with the above action, the negative going control grid 35 tends to decrease the electron flow to the anode 32 offsetting the effect of the now positive going first control grid 33 so that the electron flow from the cathode 36 to the anode 32 is maintained substantially constant. Conversely, when the potential applied to the first control grid 33 tends to go negative, the potential on the second control grid 35 is tending to go positive. The negative going first control grid 33 tends to decrease the electron flow from the cathode 36. This results in a decrease current flow in the screen-cathode circuit which causes the potential on the screen grid 34 to increase and the potential on the cathode 36 to decrease. By virtue of the in-phase connections of the secondary windings 42, 46 of the screen transformer 44 and the cathode transformer 40, the net effect to the terminals 49, 50 is to add the decreased potential to be supplied to the telephone system. The degenerative feedback loop suppresses the magnitude of the signal as described above. Simultaneously the positive going second control grid tends to increase the electron flow to the anode 32 offsetting the effect of the negative going first control grid 33 so that the electron flow from the cathode 36 to the anode 32 is maintained substantially constant.

In summary: two electron flows occur, namely, from the cathode 36 to the anode 32, and from the cathode 36 to the screen grid 34. In receiving signal voltages from the receiver 21, the electron flow from the cathode 36 to the anode 32 is maintained substantially constant so that a varying potential applied to the control grids is not reflected in the anode circuit. The electron flow from the cathode 36 to the screen grid 34 varies as the applied varying potential to the control grid 33. Since the potential on the anode 32 remains substantially constant the received signal voltages will not go to the transmitter 20. The received signal voltage is, however, reflected in the screen grid 34 and the cathode circuit by varying the electron flow and current and is reflected in turn through the in-phase transformers 40, 44 to the terminal points 49, 50. It may be appreciated then that an applied signal voltage received at the receiver 21 is reflected for all practical purposes in the cathode-screen grid circuits and transferred through the coupling transformers 40, 44 to the terminals 49, 50.

Signal voltages received at receiver 21 are channeled through the valve means 31 to terminals 49 and 50 without appreciably varying the potential on the anode circuit and hence, the received signal voltage is isolated from the transmitter 20. In sending a signal voltage from terminals 49 and 50 to the transmitter, the signal voltage is received via conductors 55 and 56 from the telephone receiver and circuitry to be explained later and is applied to the cathode circuit via transformer 40 which causes the electron flow to both the anode and screen grid circuits to vary by changing the potential between the cathode and ground. This causes a varying potential on the screen grid which is introduced back to the cathode circuit in a degenerative feed back loop of the transformers 44, 42 which stabilizes the current flow in the valve means 31 and a varying potential in the anode circuit which is sent to the transmitter 20 via transformer 37.

To better understand the ringing circuit components, consider for explanation purpises only, that an operated station which desires contact has transmitted a contact signal of an 800 cycle frequency signal voltage which was received by the receiver 21, converted to a push-pull voltage and applied to the hybrid unit 30 via conductors 22, 23 and subsequently channeled to terminals 49, 50, in the above described manner. Conductors 55, 56 connect the received signal voltage at terminals 49, 50 to movable contacts 57, 58 and stationary contacts 59, 60, respectively, of a relay means 61 which is shown in its non-energized position. The stationary contacts 59, 60, in turn, are connected to a frequency sensing means 100 by means of conductors 62, 63 and to the telephone receiver units 11 via conductors 64, 65 and switch means 66.

The frequency sensing means 100 is composed of a line bridging transformer 70, an amplifier stage 85 which amplifies and shapes the received signal voltage, a filter stage 99 which will pass only a given frequency, in this case the 800 cycle frequency, a second amplifier stage 107 to amplify the signal voltage passed through the filter, and a switching stage 115 which in turn connects the frequency generator 200 to the telephone receiver unit 11 through proper circuitry.

More specifically, the conductors 62, 63 are connected to the primary winding 71 of the bridging transformer 70. A low frequency impedance capacitor 73 is connected in series between the primary windings 71*a* and 71*b* for reasons which will be apparent later. A high impedance resistor 75 is connected across the secondary winding 74 to provide an impedance match. The signal voltage impressed across the primary windings 71 of the bridging transformer 72 is reflected in the secondary windings 74 and is then applied between a control grid or member 76 and cathode 78 of electric valve means 77. The electric valve means 77 also has an anode 81 which is connected to the positive side of a direct current source B+2 through a load resistance 82 and the cathode 78 is connected to the other side of the direct current source through a biasing resistor 79 and a shunt by-pass condensor 80. The electric valve means 77 is controlled by the control grid or member 76 which is connected to one side of the secondary winding 74, the other side of the secondary winding being connected to the cathode 78 through the resistor 79 and the condensor 80. If the voltage variations on the control grid tend to be more negative with respect to the cathode 78, the electron flow from the cathode will be decreased. If the grid tends to go more positive with respect to the cathode 78 the electron flow and conductivity of the electric valve means 77 will increase. The increase and decrease of conductivity varies the current flow through the valve means 77 and in turn, the potential on the anode 71 will vary according to the varying current. It will be appreciated then, that in a known manner, a small signal voltage applied to the control member 76 causes a great variation in electron and current flow which causes an amplification of the applied signal voltage to be reflected in the varying potential on the anode 81.

The amplified signal voltage on the anode 81 is fed to a second amplifying electric valve means 83 by means of a coupling condenser 84 to the control grid 86 of the amplifying means 83. The control grid 86 has a clipping circuit composed of a diode or one way valve means 87 such as a metallic oxide rectifier connected between ground and the common junction 84*a* of the capacitor 84 and the control member 81 and a grid leak resistance 88 connected between the control 86 and ground. The clipping circuit operates to shape the received signal voltage and limit its amplitude. To further explain the action, assuming the signal voltage to go more positive on the anode 81, the coupling capacitor 84 will charge up, drawing electrons through the path of least resistance, namely, the one way valve 87 which offers little or no impedance to the flow of electrons in this direction. This, in turn, causes the control grid 86 of the amplifying means 83 to be biased at the potential existing across the one way valve means 87 which is a low potential. When the signal voltage on the anode 81 goes less positive, the condenser 84 will begin discharging through the grid leak resistance 88. This causes the control grid 86 of the amplifying means 83 to be biased to a more negative potential so that the electron flow is diminished as the condenser 84 discharges. As the signal voltage again goes positive to the point where the one way valve 87 conducts the condenser again charges thru the diode 87. It may therefore be appreciated that the bias across resistance 88 and the control grid 86 is fairly constant while the condenser 84 charges which means that the more positive portion of the varying potential on anode 81 is clipped off and that when the condenser 84 is discharging the bias across resistance 88 and consequently the control grid 86 is driven more negative which decreases the current and electron flow in valve means 83.

The amplifying means 83 has an anode 91 connected to the positive side of a direct current source B+2 through a load resistance 92 and a cathode circuit connected to the other side of the direct current source through a bias resistor 90. The amplifying means 83 also has a screen grid 93 which is connected to the positive side of the direct current source B+2, and a suppressor grid 94 which is connected to the cathode 89 to prevent secondary emission of electrons from the anode 91. It will now be apparent that the shaped varying potential applied to the control grid or member 86 will cause the electron flow and conductivity of the amplifying means 83 to vary correspondingly. The potential on the anode 91 will vary according to the increase and decrease of current flow or conductivity of the amplifying means 83 in a known manner. The varying potential on the anode 91 is substantially sinusoidal and is fed through a coupling condenser 95 to a tuned tank circuit 93 or a mechanical tuning fork filter 99. The tuning fork filter is composed of a tuning fork 97 positioned between a driving coil 96 which maintains the tuning forks in vibration at the resonant frequency of the fork and a pick up coil 98 in which an induced potential is produced by the vibration of the tuning fork. As will be apparent to those skilled in the art, the tuning fork 97 is maintained in vibration by the varying current in driving coil 96 which is induced by the signal voltage on the anode 91 of the amplifying means 83. The tuned tank circuit 93 acts to stabilize the waveform of the signal voltage by the alternate charging and discharging of condenser *94a* into the driving coil 96. The pulsation of the current in the driving coil 96 must be substantially the same as the mechanical resonant frequency of the fork 97 to cause the fork to vibrate and this induces a signal voltage to the pickup coil. It will therefore be apparent that pulsations of the current in the driving coil of the current in the driving coil of frequencies above and below the resonant frequency of the fork 97 will not induce a signal voltage in the pick up coil. Consequently, the 800 cycle frequency tuning fork acts as a mechanical filter to block all but a single given frequency. Because of the mechanical arrangement and inertia of the fork, a sustained signal for a period of about 1 second is necessary to insure the passage of the signal thru the fork. This feature prevents the frequency sensing means from operating if a spurious 800 cycle signal is received.

Assuming the signal voltage received and is of the proper frequency, namely, 800 cycles per second in this instance, the pick up coil 98 will have a signal voltage or potential at a frequency of 800 cycles per second. This signal voltage is applied between a control member 101 and the cathode of an amplifying means 102. The amplifying means 102 has an anode 103 connected to the positive side of a direct current source B+2 through a load resistor 106 and a cathode 104 connected to the other side of the direct current source through a bias resistor 105. It will now be apparent that a varying potential applied between the control member 101 and cathode 104 will cause a respective increase or decrease of electron flow and of the conductivity of the amplifying means 102. Accordingly the increase or decrease of current flow will cause the potential on the anode 103 to vary. The varying potential on the anode 103 is fed through a coupling capacitor 108 to a rectifying network which provides a substantially constant potential. This rectifying network is composed of one way valve means 109, such as a diode or metallic oxide rectifier, connected in parallel with a serially connected resistor 111 and capacitor 112 between the capacitor 108 and ground. As the varying potential on the anode 103 of amplifying means 102 goes less positive, the capacitor 108 discharges through the low impedance one way valve means 109. When the varying potential on the anode 103 goes more positive, capacitor 108 will charge drawing electrons through the resistance 111 and from capacitor 112 and consequently inducing a potential across the resistance 111 and capacitance 112. In the succeeding cycle, the capacitor 108 will again discharge through one way valve 109, however, the capacitor 112 will also discharge through the resistance 111, and one way valve 109. It may be appreciated, therefore, that the capacitor 112 acts to smooth out the pulsating potential across resistance 111 and the potential across capacitor 112 will remain substantially constant. The substantially constant potential across capacitance 112 is applied between control member 114 and the cathode of a switching electric valve means 116.

The electric valve means 116 is normally non-operating and has an anode 117 connected to the positive side of a source of direct current B+2 through a direct current winding 118 of a switching relay 119. A cathode 120 is connected to the other side of the direct current source through a biasing resistance 121. A biasing voltage is applied to the cathode 120 through a voltage dividing network including the biasing resistance 121 connected to one side of a direct current source and a voltage dropping resistance 122 which is connected to the positive side of a source of direct current B+2. It may be appreciated therefore, that the application of a positive potential between the control grid 114 and cathode 210 will cause an electron flow and the valve means 115 will conduct which, in turn, induces a current flow through the winding 118 of the switching relay 119 causing the relay 119 to be energized which, in turn, closes movable contact 123 with the stationery contact 124. The closing of contacts 123, 124, in turn, connect the positive side of a source of direct current B+1 through a current limiting resistance 125 and conductor 126 through a relay coil 126 of a switching relay 66 to the other side of the direct current source which causes relay 66 to be energized which connects the frequency generator 200 to the telephone receivers 11 through contacts 130, 131, 127, 128.

It is now apparent the receipt of the contact signal, namely, an 800 cycle frequency signal voltage in the receiver 21 will be channeled through the hybrid unit 30 to the switch means 61 and through conductors 62, 63 to the frequency sensing means 100 which, in turn, causes switching relays 119 and 66 to be energized. Any other frequency signal voltage will not pass the filter stage 99 and consequently the 800 cycle frequency signal voltage is, in effect, a tripping signal for the relays 119 and 66.

When switching relay 66 is energized, the frequency generator 200 is supplied with power and has its output connected to the telephone receiver unit 11. The output of the frequency generator 200 is of such a frequency as to actuate an audio bell means 13 in the telephone receiver unit 11 so that a bell-tone is produced. It may be appreciated then, that if a person at one station contacting another station causes a contact signal of an 800 cycle frequency signal voltage will sense the received signal voltage and in turn, sound an audio bell tone which brings the attention of another person to the telephone receiver 11.

More specifically, when relay 66 is energized, movable contacts 127, 128, 129 close with the stationary contacts 130, 131, 132, respectively, and open stationary contacts 133, 134. Movable contact 129 is connected to the positive side of a direct current source B+ and the closing of the said contacts supplies direct current to the frequency generator.

Conductors 135, 136 connect the direct current supply to the signal generator 200. The direct current is fed through a filter in each conductor which consists of an inducance 137 in series with the conductor and a capacitor 138 connected between ground and the conductor. Since the inductance resists changes in voltage levels, the capacitance 138 will be charged on sudden changes and will subsequently discharge as the inductance flux builds up. As a consequence, any ripples in the potential are smoothed out to present a more constant potential level.

The signal generator 200 consists generally of an energizing coil 139 wound about a core 140, vibrator reeds 141, 142 which vibrate about points 143, 144, respectively, and which are mechanically coupled together by a single magnetic vibrating weight 145, the coupling being shown in the drawing by the dotted line connection. Weight 145 is positioned slightly off center with respect to the core 140. A movable energizing contact 146 is shown in its contacting position with the reed 141 and stationary contacts 147, 148, 149, and 150 shown positioned on either side of reeds 141, 142. The weight 145 and vibrator reeds 141, 142 have a definite mechanical resonant frequency, for example, 20 cycles per second. The vibrator reeds 141, 142 are set in motion by the application of the potential across conductors 135, 136. The conductor 135 is connected to the energizing coil 139 which is wound about a core 140 which, in turn, is connected to the movable energizing contact 146, which in the center position makes contact through the vibrator reed 141, to the conductor 136. The potential applied across conductors 135, 136 causes the coil 139 to energize, and in so doing, the magnetic attraction of the core 140 moves the magnetic weight 145 to the left breaking contact with the movable contact 146.

The resistance 151 is connected between the coil 139 and the conductor 136 to limit the current flow through the coil 139. The reeds 141, 142 are connected to conductors 136 and conductor 135 respectively, whereby a periodic reversing of current flow may be accomplished in output conductors 152, 153 in the following manner. When the reeds 141, 142 swing to the left making contact with contactors 148, 150 the potential is applied across the respective contactors 148, 150. Contactors 148, 150 are in turn connected to output conductors 153, 152 through the respective connecting conductors 154, 155 so that output conductors 152, 153 are respectively at potential of a certain polarity. Because of the inherent resiliency of the vibrator reeds 141, 142, they swing to the right and break contact with contact with contactors 148, 150 and make contact with contactors 147, 149 and movable contact 146. The contactors 147, 149 have the potential applied across them and, in turn, are connected to the output conductors 152, 153 in a reverse connection which reverses the polarity of the potential across the conductors 152, 153. It may therefore be appreciated that the conductors 152, 153 have alternately impressed thereon a potential of different polarity caused by the alternate closing of the contactors which is due to the vibrating action of the reeds 141, 142. Since the reeds 141, 142 have a mechanical frequency of 20 cycles per second, the alternating potential will be applied 20 times per second or in other words, a signal voltage with a frequency of 20 cycles per second is produced. It will be appreciated that the swing to the right by the vibrator reeds 141, 142 making contact with movable contact 146 recycles the operation.

Also in the circuit are conventional RC circuits 156 consisting of a resistance and capacitance in series. Each contactor has one of these circuits connected between the contact and a potential conductor 135 or 136. When the contact and reed are opened, the capacitor will discharge through the associated resistance. This prevents any arcing which would be caused by the sudden breaking of contact since the capacitor accepts the charge.

The output conductors 152, 153 have an inductance 157 connected in series and capacitance 158 connected between the conductors and ground, to smooth the alternating pulses into a sinusoidal waveform. This is accomplished by the reactance of the inductance 157 which opposes a sudden polarity change so that most of the change is applied to the capacitor 158. When the polarity of the signal again changes, the capacitor discharges to the inductance. A ballast tube 159 is connected in series with the output conductor 153 to maintain a constant current by means of a variable resistance wire in the tube and also prevents the burning out of the vibrator due to any short circuits in the system. As the current increases through the wire, the resistance increases and the voltage drop across the tube increases. This, in turn, maintains the voltage output more nearly constant.

Output conductors 152, 153 are connected to stationary contacts 131, 130. Since the relay 66 was actuated, contacts 131, 128 and 130, 127 are closed to thereby connect the signal voltage generated across output conductors 152, 153 to the conductors 15, 16 to the telephone receivers 11. The frequency of the signal voltage generated by the frequency generator 200 is the given frequency necessary to actuate the bell means 13 in the telephone receiver units 11.

It will be apparent therefore, that receipt of an exemplary signal voltage of 800 cycles frequency will pass through the frequency sensing device 100 which, in turn, actuates a 20 cycle frequency generator 200. The 20 cycle frequency of a given signal voltage will ring a bell means in receiver 11. When the 800 cycle frequency is stopped, relay 119 deenergizes which deenergizes the relay 66 which, in turn, disconnects the frequency generator 200. When the relay 66 drops out the hybrid 30 is connected to the telephone units 11, via relay 61, conductors 64, 65 and relay 66 to allow communication therebetween.

Once the telephone receiver 10 has been answered audio frequency signals received by the receiver 21 are passed through the hybrid unit 30 in the manner, above described, and sent the relay 61. Since these audio frequency signals are not sustained 800 cycle signal frequency the signal sensing means 100 is impervious to the signals received. The audio signals consequently are fed to the telephone receiver 11 via conductors 64, 65 and relay 66 through the switch contacts 134, 128 and 133, 127.

The person answering into the telephone receiver has the audio signals pass via conductors 15 and 16, relay 66, conductors 64 and 65, relay 61 to the hybrid 30 to the transmitter 20 for transmission. Hence, a two way communication is effected. It will be appreciated that, at each station, several persons may enter into or listen to conversion by virtue of the plurality of telephones at each station.

To initiate a call from the telephone receiver 11, the frequency generator 12 is used to generate a signal voltage a given frequency, for example, 20 cycles per second which is transmitted through the conductors 15, 16, the deenergized relay 66 and via contacts 128, 134 and 127, 133 to the conductors 64, 65. A relay coil 159 of switch relay 160 which is responsive to a 20 cycle signal is actuated by the generated 20 cycle frequency signal voltage. Capacitor 161 in conductor 55 and capacitor 73 in the line bridging transformer 70 are so designed to present a high impedance to the 20 cycle frequency. Switch relay 160 energizes to close contacts 161, 162 which provide a direct current energizing potential to the winding **61*a* of relay 61. Relay 61 energizes to disconnect the audio conductors 64, 65 and the frequency sensing means 100 from the hybrid 30 and to make contacts 57, 163 and 58, 164 which connect in the output of the frequency generator 300 to the hybrid 30 and also makes contacts 164*a*, 165 which connect the positive potential B+2 of a source of direct current to an output amplifier means 170 of the frequency generating means 300**.

The frequency generating unit 300 operates to produce a given 800 cycle frequency signal of signal voltage to be sent to the transmitter 20 through the relay 61 and hybrid 30. A tuning fork 171 is employed as a frequency standard and is positioned between a driving coil 172 and a pick up coil 173. In operation, a varying potential of the proper frequency in the driving coil 172 will cause the fork to vibrate at its given resonant frequency. The vibration of the tuning fork 171, in turn, induces a varying potential of a predetermined frequency 173. The pick up coil 173 has it opposite ends connected to a control member 174 and cathode 175 of an amplifying valve means 176 to impress the varying potential generated in the pick up coil between the control member 174 and cathode 175. The valve means 176 also has an anode 177 connected to the positive side of a source of direct current B+2 through a load resistance 178 and the cathode 175 is connected to the other side of the source of direct current. It will be appreciated by those skilled in the art that as the potential on the control member 174 varies, the electron flow and conductivity of valve means 176 will also vary. The increase and decrease of conductivity means more or less current flow through the valve means 176 so that the potential on the anode 177 will vary. A coupling capacitor 179 connects the varying potential on the anode 177 to the control member 180 of electric valve means 181.

The electric valve means 181 also has an anode 182 connected to the positive side of a source of direct current B+2 through a load resistance 183 and a cathode 184 connected to the other side of the source of direct current. The control member 180 is connected to the cathode 184 by means of a grid leak biasing resistor 185 and is also connected to the anode 182 by means of a coupling capacitance 186 which provides a feedback to stabilize the waveform of the varying anode potential with respect to phase and amplitude. When the varying potential on anode 177 of valve means 176 tends to go more positive, the control member 180 of valve means 181 tends to go more positive due to the charging of capacitance 179 which, in turn, causes a current flow from the control member 180 to the cathode 184 which charges the capacitor 179 in a very short time. The electron flow being diverted through the control member 180 decreases the conductivity of valve means 181 and correspondingly the potential on the anode 182 will increase. The increasing potential on anode 182 causes the coupling capacitor 186 to charge up to the increasing potential which, in turn, draws more electrons from the control member 180. Since the charging of coupling capacitance 186 is out of phase with respect to the current flow in the control member 180, the conductivity of valve means 181 is correspondingly decreased for a longer length of time. The decrease of the time of conductivity causes the potential on the anode 182 to increase for a longer time. When the potential on the anode 177 of valve means 176 tends to go less positive, the capacitance 179 will discharge through the resistance 185 which causes the control member 180 to become less positive which, in turn, allows electron flow to increase between the cathode 184 and anode 182. Accordingly, the increase in conductivity in valve means 181 causes increased current flow and the potential on the anode 182 will decrease. The decreasing potential on anode 182 causes capacitance 186 to accordingly discharge through resistance 185 and being out of phase extends the time of conductivity of the valve means 181. The varying potential on anode 182 of valve means 181 is fed through a coupling capacitor 187 to junction 188, where a feedback loop is provided via conductor 189, potentiometer 190 to the driving coil 172 which together with a shunt capacitor 191 provide a tuned tank circuit. It will be apparent to those skilled in the art that upon actuation, a random pulse due to some inequalities of the components will cause a potential to vary which will amplify and feedback continuously until the operating frequency of the tuning fork 171 is reached.

The varying potential from junction 188 is also fed through a potentiometer 192 and potentiometer arm 193 to the control member 194 of electric valve means 195 which is the output amplifier 170. The valve means 195 has an anode 196 which is connected to the positive side of a direct current source B+2 through a primary winding 197 of a coupling transformer 198 and contacts 165, 164 of relay 61 and also has a cathode 199 which is connected to the other side of the source of direct current through a biasing resistor 201 and a shunted bypass condenser 202. As the potential varies on the control member 194, the conductivity and electron flow in the valve means 195 will vary. The varying current, in turn, causes a varying potential on the anode 196 which is reflected in the primary windings 197 of transformer 198. The varying potential in a primary windings 197, in turn, produce a varying potential in secondary windings 203 which, in turn, is reflected to the hybrid 30 via conductors 204, 205, contacts 164, 58 and contacts 163, 57 of switch relay 61 and conductors 55, 56. The varying potential or voltage is passed through the hybrid 30 to the transmitter 20 in the manner described with respect to the description of the hybrid 30.

Once transmitted, the 800 cycle frequency varying voltage will be picked up by the receiver at another station and, in accordance with the above described manner, will ring the telephone receiver units of that station.

It will be recalled that more than one telephone receiver may be utilized at each station and that more than one person may enter into and hear the conversation. As explained supra, the hybrid 30 has the cathode 36 and screen grid 34 connected in a circuit whereby the gain of the valve means 31 is made more independent of the load impedance. To further compensate for varying impedances in the telephone receiver circuit, a loading resistance 206 of proper value has been connected in parallel with the telephone units 11 shown in FIGURE 2 between conductors 55, 56. This results in a loading of the telephone impedance which gives a more constant, though lower, output voltage level. The following chart, for illustration purposes only, will illustrate the point.

| Number of phones in parallel | Unloaded circuit impedance, ohms | Loaded circuit impedance, ohms |
|---|---|---|
| 8 | 75 | 12.5 |
| 4 | 150 | 75 |
| 2 | 300 | 100 |
| 1 | 600 | 120 |

Assuming that the telephones have a 600-ohm impedance, 8 phones in parallel will give a total impedance of 75 ohms whereas if only one telephone is considered the total impedance is 600 ohms. It will be appreciated that the 525-ohm difference variation of impedance will accordingly greatly vary the output voltage level for a constant power input. Whereas, if an additional resistance load is connected in parallel with the telephones and has an exemplary value of 150 ohms, it will be seen that the impedance will only vary 107.5 ohms and accordingly the output voltage level for a constant power input will remain fairly level and give a more constant response. The effect of using the loaded circuit in this invention allows a more constant voltage level when more than one telephone is connected in the circuit. This obviates the obvious disadvantage of a large drop of voltage level which occurs in a non-loaded circuit. The more constant voltage level, of course, means a more constant audio level in the communication system so that a multiple of telephones may be effectively used and still maintain the audio level.

It will be readily apparent to those skilled in the art that the hybrid unit 30, as disclosed, may have any number of other applications wherein it is desired to channel a signal voltage from one channel means to a duplex channel and, in turn, channel signal voltage from the duplex channel to a second channel means.

It will also be apparent to those skilled in the art that this invention is not limited to specific frequency generators or sensing means and that these means may be combined, eliminated or modified as matters of design which will essentially operate in an anologous manner. Likewise, different frequency generators could be utilized for selective ringing of selective telephone receivers designed in compatibility with the frequency generators.

It will readily be apparent that this invention discloses an electric valve means 30 which will selectively operate in two different manners, namely, selectively isolating a received signal voltage from the anode circuit and selectively causing the anode circuit to respond to an applied varying voltage. More particularly, the electric valve means 30 in conjunction with the radio receiver and transmission system allows effective two way communication between a plurality of station units. It will also be noted that the invention discloses a new and improved electronic circuit which has an incoming channel 22, 23, an outgoing channel 18, 19 and a terminating channel 55, 56 and a valve means 30 wherein signal voltages received in the incoming channel are sent to the terminating channel and eliminated from the outgoing channel by direct waveform cancellation in the valve means 30 and signals of signal voltages emanating from the terminating channel are sent to the outgoing channel and more particularly where an incoming signal voltage is effective to initiate a ringing bell means 13 in a telephone receiver unit 11 and wherein a signal voltage may be initiated in the telephone receiver 11 to initiate a ringing bell means in a telephone receiver unit at a distant station. Loading means 206 are provided to maintain a more constant voltage level for varying impedance due to the use of additional telephones.

It will also be apparent that this invention provides a substantially constant communication signal power level under varying impedance conditions. That is, when two stations are in communication, a person speaking at one station has the speech transmitted by virtue of voltage signals transmitted from one transmitter to the receiver at the other station. The receiver is connected to the selecting and channeling means so that the received signal is channeled to the telephone receiver and is isolated from the transmitter of the station receiving the signals. It will be appreciated that if, for example, two telephone receivers are in use at the receiving station, that the line impedance to the selecting and channeling means is different than if only one, or more than two telephone receivers were in use. However, the degenerative feedback in the hybrid 30 and the loading impedance 206 minimize the effects of the varying impedance of using a plurality of telephone receivers simultaneously so that the signal to the listening persons at the telephone receivers is maintained on a substantially constant audio level.

Conversely, when the persons at the station who were listening, answer via the telephone receivers to the transmitters, the hybrid and loading impedance tend to maintain the audio level constant for a plurality of telephone receivers simultaneously in use so that the signal transmitted is within a substantially level audio range.

Figures 3, 4:
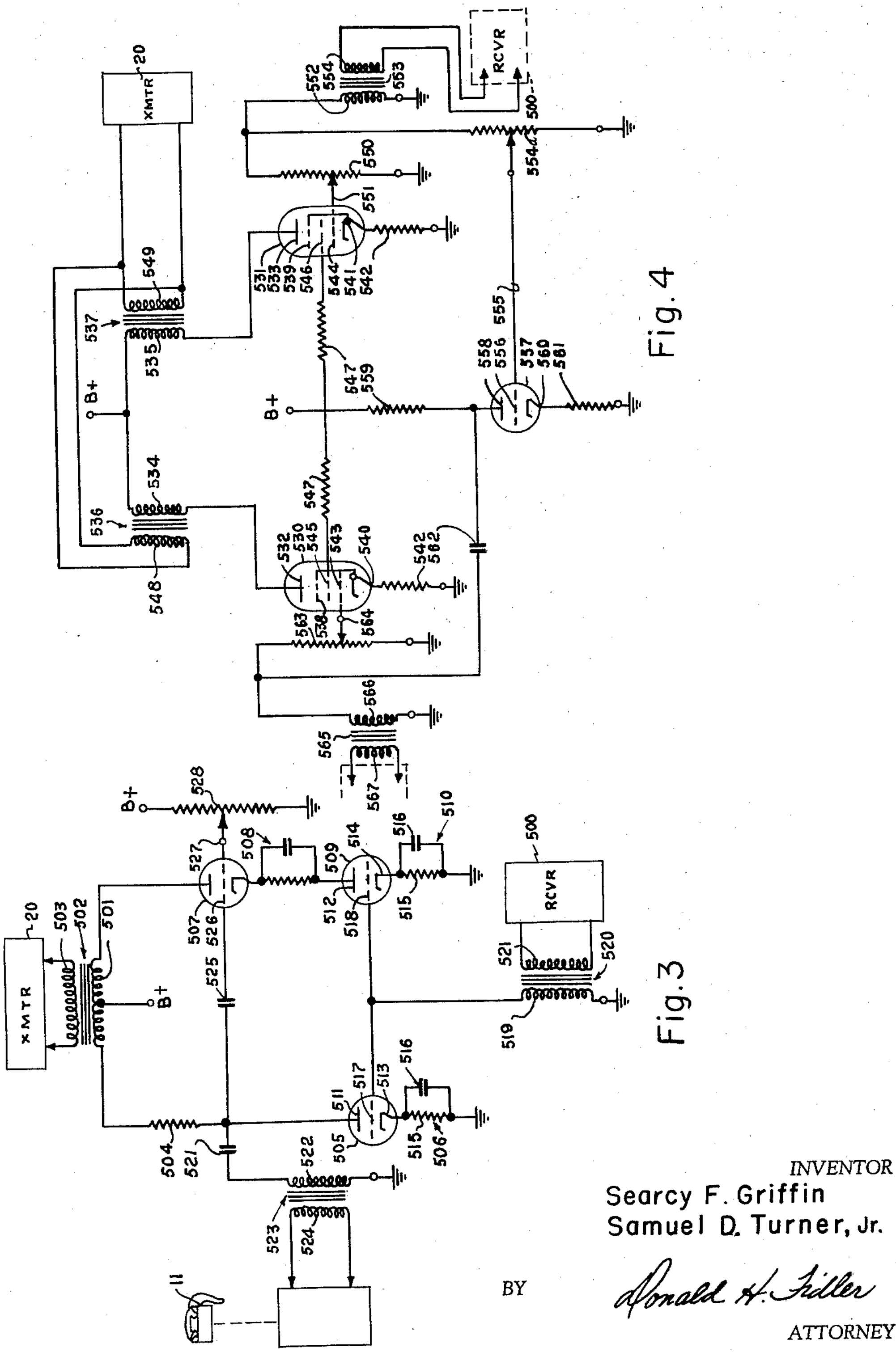
FIGURE 3 illustrates another form of channeling and selecting unit.
FIGURE 4 illustrates still another form of the selector and channeling unit.

Referring now to FIGURE 3, another form of this invention is shown wherein the use of three triodes properly connected will function as a selecting and channeling device which may be substituted for the preferred embodiment of single valve means 31.

It will be recalled that the dual function of the selecting and channeling means of FIGURE 2, in general, is to channel a received signal voltage from the receiver 21 to the telephone receiver unit 11 while isolating the received signal voltage from the transmitter 20 and to allow a signal voltage emanating from the telephone receiver unit 11 to be sent to the transmitter 20.

The device of FIGURE 3 operates in a similar manner to channel a received signal voltage from the receiver 500 to the telephone unit 11 while isolating the received signal voltage from the transmitter 20 and to allow a signal voltage emanating from the telephone receiver unit 11 to be sent to the transmitter 20.

A received signal voltage in the receiver 500 is canceled or isolated from the transmitter 20 by canceling the received signal voltage in the primary windings 501 of a coupling transformer 502 which has its secondary windings 503 connected to the transmitter 20. The cancellation is accomplished by applying the received signal voltage to each end of the secondary windings 501 in phase so that the potential at both ends of the said windings increases or decreases as the applied signal voltage does. It will then be appreciated that there is no potential impressed across the ends of the said secondary windings and the received signal voltage will not be sent to the transmitter 20. To apply the signal voltage in phase to the ends of secondary windings 501, a parallel circuit arrangement is used wherein one leg of the circuit is composed of one half of the said primary windings connected from the positive source of direct current thru a load resistance 504, an electric valve means 505 and a biasing circuit 506 to the other side of the direct current. The other leg of the circuit is composed of the other one-half of the said primary windings connected from the positive source of direct current thru a serially connected valve means 507, a bias circuit 508 another valve means 509 and a bias circuit 510 to the other side of the direct current. For purposes of explanation, consider the impedance of load resistance 504 to equal the impedance of the valve means 507 and biasing circuit 508. It will then be appreciated that the positive soruce of direct current B+ is connected through each end of the secondary windings 501 through equal impedance loads to anodes 511 and 512 of the respective electric valve means 505 and 509. Also in the said valve means are cathodes 513 and 514 which are respectively connected to the other side of the direct current source through biasing resistors 515 and shunt connected bypass condensers 516; and control members 517 and 518 which are connected to the other side of the direct current source through a secondary winding 519 of a coupling transformer 520 the primary winding 521 of the said transformer being connected to the receiver 500. It will now be seen that if a signal voltage is applied between the respective cathode and control members of valve means 505 and 509, that an increase and decrease of electron flow and conductivity of the valve means occurs which, in turn, causes an increase and decrease in the potential on the respective anodes and, hence, the potential across the impedance loads and primary windings 501 will vary. As explained supra, the potential across each half of the primary windings will vary in phase so that no potential will be induced to the secondary windings 503 of the transformer. Hence, a signal voltage received in the receiver 500 is transferred from the primary windings 521 of transformer 520 to the secondary windings 519 to the valve means 505 and 509 and applied equally to each half of the primary windings 501 which prevents the applied signal from being transmitted.

To channel the applied signal voltage to the telephone receiver unit 11, a coupling capacitance 521 and primary winding 522 of a coupling transformer 523 are serially connected between the anode 511 of valve means 505 and the ground source of direct current. As the potential on the anode 505 varies according to the applied signal voltage to the said valve means, the capacitor 521 will charge and discharge through the secondary winding 523 causing a varying potential to be induced in the windings 522 according the charging and discharging of the said capacitor. The varying potential in the primary windings 522 is transferred to the secondary winding 524 in a manner well known and accordingly will reach the telephone receiver unit 11 in the manner prescribed with respect to the apparatus of FIGURE 2. Also connected to the anode 511 of valve means 505 is a decoupling capacitor 525 which connects the said anode to the control member 526 of valve means 507 which is in turn positively biased by means of an adjustable arm contact 527 and a potentiometer resistance 528 which is connected across a source of direct current. Capacitance 525 will also charge and discharge as the potential on anode 505 varies therefore the bias voltage on control member 526 will vary in accordance with the variation in potential across the said capacitance. The bias on the control member 526 is adjusted so that the signal voltage on the control member causes the signal voltage on the anode 507 and the one half of primary windings 501 to be of the same magnitude as the signal voltage on the other half of the said windings.

To transmit a signal voltage from the telephone receiver unit 11, the signal voltage is generated in the same manner as described with respect to the apparatus of FIGURE 2. The signal voltage is applied to the coupling transformer 523 and accordingly causes a varying potential to be induced in the secondary windings 522 which, in turn, causes the capacitor 521 to charge and discharge. This, action reflects a small potential variation in one half of primary windings 501 and also through the alternate charging and discharging of the capacitor 525 induces a varying potential on control member 526 of valve means 507 which varies the conductivity of the said valve means. The varying conductivity of valve means 507 produces a large varying potential across the other half of the primary windings 501 which, in turn, is reflected to the secondary windings 503 to the transmitter 20 for transmission.

It will now be appreciated that a received signal voltage will vary the conductivity of valve means 505 and 509 which provides a varying current flow in each of the said valve means which causes each half of the primary windings 501 to have an equal or opposite current flow which isolates the received signal from the transmitter 20. One of the conducting valve means provides an output junction to the telephone receiver unit 11. Conversely, to send a signal voltage, the signal is applied to the control member of another valve means 507 which, in turn, causes the signal to be reflected to the transmitter 20 through the transmitter transformer.

Turning now to another form of this invention as shown in FIGURE 4, there are shown a pair of similar valve means 530 and 531 having anodes 532 and 533 which are connected to a positive source of direct current B+ through the respective primary windings 534 and 535 of the respective transformers 536 and 537; suppressor grids 538 and 539, which are connected to the cathodes 540 and 541 respectively, which, in turn, are connected to the ground side of the source of direct current through biasing resistors 542; control members 543 and 544; and screen grids 545 and 546 which are connected to a positive source of direct current B+ through voltage dropping resistors 547. It will be appreciated that if a signal voltage is applied to each of the control members 543 and 544 180° out of phase, the conductivity and current flow of each valve means will accordingly vary and the varying current will cause a varying potential to be induced in the primary windings, of transformers 536 and 537. If the applied signal voltage signal to the said control members, is of the same magnitude, the varying potentials in the said primary windings, will vary in like magnitudes. It will now be seen that if a signal voltage is received by the receiver 500 and applied 180° out of phase to each of the said control members, that the secondary windings 548 and 549 of transformers 536 and 537 respectively may be properly connected so that the potentials induced in the said secondary windings by the said primary windings, is effectively cancelled out and no signal will reach the transmitter 20. To apply a signal voltage to the respective members, the control members 544 is connected across a potentiometer resistance 550 by means of an adjustable arm 551. The potentiometer resistance is, in turn, shunt connected to a secondary winding 552 of a coupling transformer 553 and has one end connected to the ground side of a source of direct current. The primary winding 554 of the coupling transformer 553 is connected to the receiver 500 and it will be apparent that a received signal voltage will induce a varying potential in the secondary winding 552 of the transformer 553. Also shunt connected across the secondary winding 552 is a second potentiometer resistance 554*a* which has an adjustable arm contact 555 connected to the control member 556 of an electric valve means 557. The said electric valve means also has an anode 558 connected to a positive source of direct current through a load resistance 559 and a cathode 560 connected through a biasing resistance 561 to the ground side of the direct current source. In a manner well known, a signal voltage on the control member 556 will vary the conductivity and current flow of the said valve means which in turn, causes the potential on the said anode to vary. The signal on the anode 558 will be 180° out of phase with the signal applied to the control member 556. A capacitance 562 and potentiometer resistance 563 are serially connected between the anode 558 and the ground source of direct current so that as the potential on the said anode varies the potential across the said capacitance and potentiometer resistance will vary. A potentiometer adjustable arm contact 564 connects the control member 543 of valve means 530 to the potentiometer resistance so that the varying potential is reflected in the valve means 530. By adjustment of the potentiometers resistances 550 and 563 the varying potential on each of the said control members can be adjusted so that effective cancellation may be effective in the transmitter transformers 536 and 537 as above explained.

To apply the varying potential received to the telephone receiver unit 11, a transformer 565 has a winding 566 shunt connected across the potentiometer resistance 563 and a winding 567 connected by proper circuitry to the telephone receiver 11, for example, as shown and described with respect to FIGURE 2.

To transmit a signal voltage the signal is generated in a manner described with respect to the apparatus of FIGURE 2 and applied to the transformer 565, from telephone receiver unit 11. The signal voltage is applied across the valve means 557 but produces no significant potential variation in the control member 544 of the valve means 531, however, the signal voltage applied between the control member 543 of valve means 530 causes a varying conductivity and current flow in the said valve means which, in turn, is reflected in a varying potential in transformer 536 to the transmitter 20.

FIGURES 3 and 4, above explained, can be substituted for the hybrid single valve means 30 of FIGURE 2 and used in conjunction with the associated ringing circuits.

It will be apparent to those skilled in the art that various changes and modifications may be made in the illustrated embodiments of the invention without departing from the invention and it is intended, therefore, in the appended claims to cover all such changes and modifications as fall within the true spirit and scope of the invention.

We claim:

1. In a device of the type described; means for receiving and transmitting signal voltages; selecting and channeling means operably connected to said transmitting and receiving means, said selecting and channeling means having a termination means and being comprised of an electric valve means having an anode circuit, a cathode circuit, a control grid circuit, a screen grid circuit and a suppressor grid circuit; means connecting said control grid circuit and said suppressor grid circuit to said receiving means; means connecting said screen grid circuit and said cathode circuits to said termination means; and means connecting said transmitting means to said anode circuit; whereby signals received through the receiver and applied to said control grid and said suppressor grid circuit cancel out in the anode circuit and are transmitted through said cathode and screen grid circuit to the termination means and whereby signals applied at the termination means are transmitted through the anode circuit to the transmitter means.

2. In a device of the type described: a transmitting means; a receiving means; a termination means; and a selecting and channeling means operably connected to said transmitting means, said receiving means and said termination means, said selecting and channeling means comprising an electric valve means, said electric valve means having an anode circuit connected through a coupling transformer to the transmitting means, a suppressor grid circuit and a control grid circuit operably connected to the receiving means, a screen grid circuit connected by means of a coupling transformer to a termination means and a cathode circuit connected through a coupling transformer to a termination means, said transformers being reversely connected so that signals received through the receiver and applied to said control grid and said suppressor grid circuits cancel out in the anode circuit and will be transmitted through said cathode and screen grid circuits and the reversely connected transformers in phase to the termination means, and whereby a signal applied at the termination means is transmitted through the anode circuit and to the transmitter means.

3. In a device of the type described: a receiver means; a transmitter means; and a selector and channeling means, said selector and channeling means comprising an electric valve having an anode, a cathode, and a plurality of control members, said receiver means having output means connected to a pair of said control members; a first means operably connecting another of said control members and said cathode for establishing a circuit between said cathode and said another of said control members whose voltage varies in accordance with the voltage of said output means of said receiver means; a second means operably connecting said anode to said transmitter means whereby variations in the voltage across said anode and said cathode are transmitted to said transmitter means, said pair of control members being connected to said output means to maintain the voltage across said anode and said cathode constant regardless of the variations of the voltage of said receiver output means; and a third means operably connected with said cathode for varying the voltage across said anode and said cathode to cause said transmitter means to transmit signals and for detecting variations in the voltage across said cathode and said another of said control members.

4. The device of claim 3 including: an indicator means; filter means; means normally connecting said filter means to said third means; and means for operably connecting said filter means to said indicator means to energize said indicator means when said filter means is energized by a voltage from said third means having a predetermined frequency of variation.

5. The device of claim 4 including: a signal generator means for providing a voltage of predetermined frequency of variation; and means for selectively connecting said signal generator means to said third means.

6. An electric valve means having an anode circuit, a cathode circuit, a first control member, a second control member and a screen member circuit between said first and second control members, means for connecting said screen member circuit and said cathode circuit together so that a signal applied to said first and second control members is reflected in the said connecting means between the cathode-screen circuits while being substantially isolated from said anode circuit and whereby a signal may be applied to said cathode-screen circuits and reflected in said anode circuit, said connecting means including transformers.

References Cited in the file of this patent

UNITED STATES PATENTS

| | | |
|---|---|---|
| 2,511,948 | Wang | June 20, 1950 |
| 2,543,973 | Jensen | Mar. 6, 1951 |
| 2,734,134 | Beard | Feb. 7, 1956 |
| 2,757,342 | Linvill | July 31, 1956 |
| 2,790,029 | Hansen | Apr. 23, 1957 |
| 2,790,077 | Hinckley et al. | Apr. 23, 1957 |
| 2,826,637 | MacAdam | Mar. 11, 1958 |